(12) United States Patent
Bueche, Jr.

(10) Patent No.: US 8,751,379 B1
(45) Date of Patent: Jun. 10, 2014

(54) MOBILE MONEY TRANSFERS

(75) Inventor: Michael P. Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 228 days.

(21) Appl. No.: 12/185,718

(22) Filed: Aug. 4, 2008

(51) Int. Cl.
*G06Q 40/00* (2012.01)
*G06Q 40/02* (2012.01)

(52) U.S. Cl.
USPC ........... 705/39; 507/40; 507/30; 507/44; 507/42; 507/65; 348/14.08; 348/14.01; 726/27; 726/2; 709/218

(58) Field of Classification Search
USPC ........... 705/30, 39–40, 42, 44, 65; 348/14.08, 348/14.01, 14; 726/27, 2; 709/218
See application file for complete search history.

(56) References Cited

U.S. PATENT DOCUMENTS

| | | | |
|---|---|---|---|
| 8,220,030 B2 * | 7/2012 | Singhal | 726/2 |
| 2003/0217000 A1 * | 11/2003 | Wichman | 705/40 |
| 2004/0148252 A1 * | 7/2004 | Fleishman | 705/39 |
| 2005/0165641 A1 | 7/2005 | Chu et al. | |
| 2007/0011099 A1 * | 1/2007 | Sheehan | 705/65 |
| 2007/0203836 A1 * | 8/2007 | Dodin | 705/44 |
| 2007/0244811 A1 | 10/2007 | Tumminaro | |
| 2008/0028473 A1 * | 1/2008 | Cehelnik | 726/27 |
| 2008/0313061 A1 * | 12/2008 | Eugenio Donato Renato Limlengco | 705/30 |

OTHER PUBLICATIONS

Heather McKenzie, "Its Ambitions in the Mobile Remittances Space Have Led Vodafone to Partner With Citi to Extend the Service Beyond Kenya to Provide international Person-to-person Mobil", Heather McKenzie. The Banker. London: Oct. 2007. p. 1.*

Bala Shanmugam, "Hawala and Money Laundering: A Malaysian Perspective", Bala Shanmugam. Journal of Money Laundering Control. London: Sep. 2004. vol. 8, Iss. 1; p. 37, 11 pgs.*

Finextra. "PayPal and Sprint team on P2P mobile payments." Finextra Research Ltd 2008, published Apr. 25, 2008. [retrieved from the Internet on Oct. 13, 2008 using <URL: http://www.finextra.com/fullstory.asp?id=18387>].

Finextra. "MasterCard and Obopay team on US mobile P2P service." Finextra Research Ltd 2008, published Jun. 19, 2008. [retrieved from the Internet on Oct. 13, 2008 using <URL: http://www.finextra.com/fullstory.asp?id=18610>].

Payments News. "Visa, U.S. Bank to Launch Visa Mobile Money Transfer Pilot." Glenbrook Partners LLC, published Sep. 25, 2008. [retrieved from the Internet on Oct. 13, 2008 using <URL: http://www.paymentsnews.com/2008109/visa-us-bank-to.html>].

* cited by examiner

*Primary Examiner* — Harish T. Dass
(74) *Attorney, Agent, or Firm* — Perkins Coie LLP (57) ABSTRACT

Methods and systems are disclosed for conducting person-to-person money transfers over a handheld mobile device using any suitable text messaging service. In one implementation, the money transfer may involve a payer providing a payee's phone number and the amount to be transferred via a text message to the payer's financial institution or via the financial institution's Web site. The financial institution may then send a text message to the phone number of the payee that includes a payment ID, a hyperlink to the Web site of the payer's financial institution, and the payer's name. The payee may thereafter access the financial institution's Web site using the payment ID and enter his/her bank and account information. The financial institution may then transfer the specified amount from the payer's account to the payee's account and send a confirmation message to the payer that the transfer has been completed.

21 Claims, 9 Drawing Sheets

MOBILE MONEY TRANSFERS

CROSS-REFERENCE TO RELATED APPLICATIONS

This application is related in subject matter to, and incorporates herein by reference in its entirety, each of the following: U.S. patent application Ser. No. 12/185,723 entitled "Mobile Money Transfers," filed on Aug. 4, 2008, now abandoned; and U.S. patent application Ser. No. 12/185,715 entitled "Mobile Money Transfers," also filed on Aug. 4, 2008 and now abandoned.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to person-to-person money transfers and, more specifically, to systems and methods for providing direct person-to-person money transfers over mobile devices.

BACKGROUND

Existing methods for conducting person-to-person money transfers, as distinguished from business-to-business money transfers, typically involve one person writing a check to another person or giving cash to the other person. However, a cash payment of more than a few dollars may require the person making the payment to withdraw cash from an ATM (Automated Teller Machine) unless he/she either planned ahead for the payment or regularly carries around large sums of cash. In either case, such an arrangement is inconvenient and potentially unsafe for both the person making the payment as well as the person receiving the payment.

Writing a check is similarly inconvenient, as the person writing the check may not have his/her checkbook readily available, or the person receiving the check may not have a checking account. And in any event, he/she would need to manually deposit the check into his/her bank account in order to receive the funds, which is an added bother. The above issues are compounded when follow-up steps that normally accompany check-writing are considered, such as entering the check number and amount into an account registry, balancing the checkbook, and so forth. Last but not least, the person writing the check would risk exposing personal information on the check to the person receiving the check.

Electronic brokerage services from the likes of PayPal™ and MobiPay™ have attempted to alleviate the above inconveniences, but these services suffer from other drawbacks. For example, PayPal™, MobiPay™, and the like typically require both the person initiating the payment and the person receiving the payment to be members or otherwise have accounts opened with the services (i.e., an account holder normally may not transfer funds to a non-account holder, and vice versa). In addition, these services typically charge either the person making the payment, the person receiving the payment, or both, a small (but not insignificant) transaction fee. Furthermore, these services typically result in the payment being processed through ACH (Automated Clearing House) or a similar network, which can delay the availability of funds for up to several days. Finally, the services themselves are not banks or other financial institutions—but merely brokers—and must therefore rely on actual banks or other financial institutions to complete the money transfers.

Accordingly, for at least the foregoing reasons, it would be desirable to provide a more efficient way to conduct person-to-person money transfers.

SUMMARY

The disclosed embodiments are directed to methods and systems for conducting person-to-person money transfers. The embodiments allow person-to-person money transfer to be conducted over a handheld mobile device using any suitable text messaging service, such as SMS, e-mail, and the like. In one implementation, the money transfer may involve a payer providing a payee's phone number and the amount to be transferred via a text message to the payer's financial institution or via the financial institution's Web site. The financial institution may then send a text message to the phone number of the payee that includes a payment ID, a hyperlink to the Web site of the payer's financial institution, and the payer's name (i.e., to inform the payee of the identity of the payer). The payee may thereafter access the financial institution's Web site using the payment ID and enter his/her bank and account information. The financial institution may then transfer the specified amount from the payer's account to the payee's account and send a confirmation message to the payer that the transfer has been completed. Such an arrangement makes it possible to easily conduct direct person-to-person money transfers over a handheld mobile device.

BRIEF DESCRIPTION OF THE DRAWINGS

The foregoing and other advantages of the disclosed embodiments will become apparent from the following detailed description and upon reference to the drawings, wherein.

DETAILED DESCRIPTION

The drawings described above and the written description of specific structures and functions below are not presented to limit the scope of what has been invented or the scope of the appended claims. Rather, the drawings and written description are provided to teach any person skilled in the art to make and use the innovations for which patent protection is sought. Those skilled in the art will appreciate that not all features of a commercial embodiment of the innovations are described or shown for the sake of clarity and understanding.

Persons of skill in this art will also appreciate that the development of an actual commercial embodiment incorporating aspects of the innovations will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the innovation or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Figure 1:
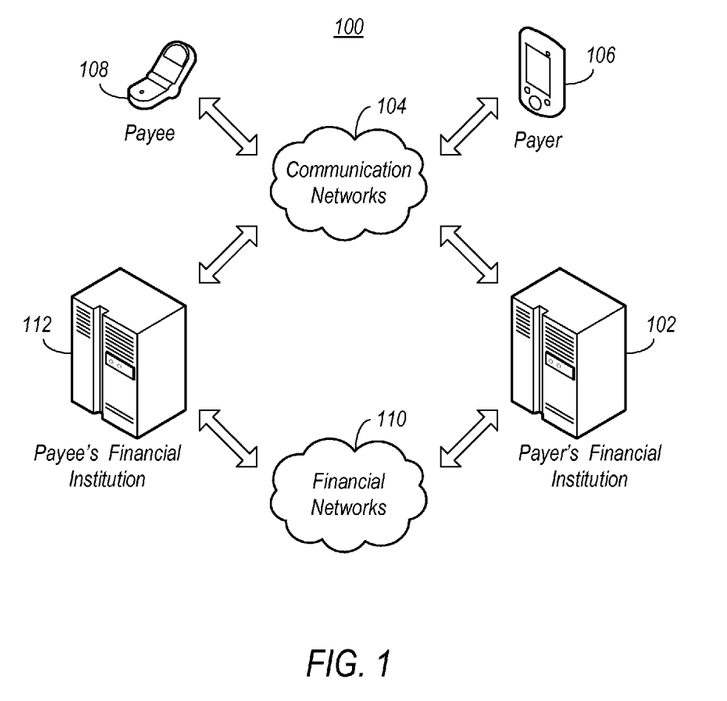
FIG. 1 illustrates an exemplary infrastructure for conducting person-to-person money transfers over handheld mobile devices according to disclosed embodiments.

Turning now to FIG. 1, an exemplary infrastructure 100 is shown that is capable of being used to conduct person-to-person (as distinguished from business-to-business) money transfers over handheld mobile devices according to the disclosed embodiments. The infrastructure 100 may use simple text messaging or instant messaging to conduct the person-to-person money transfers. Any text messaging or instant messaging protocols may be used to conduct the person-to-person money transfers, including SMS (short message service), electronic mail (e-mail), and the like. Indeed, a text message is not an absolute requirement, as the infrastructure 100 may also use telephonic messaging via interactive voice response (IVR) systems to conduct either certain portions or the entire person-to-person money transfers.

In addition, the exemplary infrastructure 100 does not rely on ACH or similar financial networks that typically hold funds for up to several days before making them available (although it can certainly be configured to do so). Instead, the infrastructure 100 may use real time financial networks, such as Fedwire, which is a real time gross settlement funds transfer system operated by the United States Federal Reserve Banks, to conduct the person-to-person money transfers. In conjunction with the privately held Clearing House Interbank Payments System (CHIPS), Fedwire is the primary United States network for large-value or time-critical domestic and international payments. By using such systems, the exemplary infrastructure 100 allows funds that have been transferred to be available in real time.

Furthermore, the person-to-person money transfers conducted via the exemplary infrastructure 100 do not involve transaction brokers, but are instead provided directly by actual banks, credit unions, and other financial institutions that are insured by the Federal Deposit Insurance Corporation (FDIC). The money transfers may be conducted between members or account holders of the same financial institution, or they may be between members or account holders of different institutions. In any event, the absence of the transaction brokers eliminates an extra layer of abstraction for the money transfers, thereby helping to simplify the process.

An example of the above arrangement is shown in FIG. 1, where the infrastructure 100 can be seen to include a payer's financial institution 102 (e.g. a bank, credit union, etc.) that is connected to one or more communication networks 104, such as a cellular, satellite, and other wireless or wired communication networks. A payer 106 may then transfer a sum of money to a payee 108 by using a handheld mobile device to send a text message to the payer's financial institution 102. Note that the payer 106 and the payee 108 herein are individuals and not businesses. Examples of handheld mobile device that may be used include cell phones, smart phones, Blackberries, personal digital assistants (PDA), and the like.

After receiving the text message, the payee 108 may go to a Web site of the payer's financial institution 102 and confirm acceptance of the money. The payer's financial institution 102 may subsequently send the sum of money over one or more financial networks 110 to the payee's financial institution 112 (e.g., a bank, credit union, etc.). As mentioned above, the financial networks 110 may include Fedwire or similar real time financial networks, although it is certainly possible for ACH and the like to be used. Once the transfer is completed, the payer's financial institution 102 may send a message to the payer 106 confirming the completion.

Figure 2:
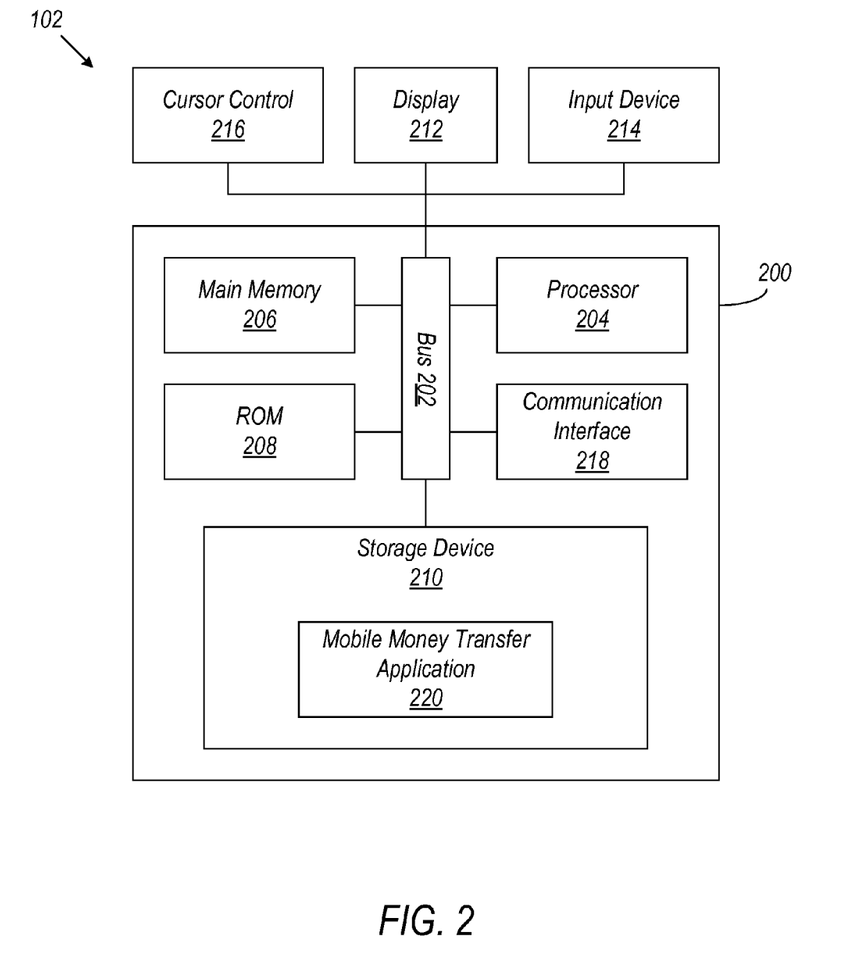
FIG. 2 illustrates an exemplary computer system that may be used for conducting person-to-person money transfers over handheld mobile devices according to disclosed embodiments.

FIG. 2 illustrates in more detail an example of the payer's financial institution 102, or a computing system 200 therefor to be more accurate. As can be seen, the financial institution's computing system 200 may be a high end computing system, such as a server, workstation, mainframe, and the like. The computing system 200 typically includes a bus 202 or other communication mechanism for communicating information and a processor 204 coupled with the bus 202 for processing information. The computing system 200 may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The computing system 200 may further include a read-only memory (ROM) 208 or other static storage device coupled to the bus 202 for storing static information and instructions for the processor 204. A non-volatile computer-readable storage device 210, such as a magnetic, optical, or solid state device, may be coupled to the bus 202 for storing information and instructions for the processor 204.

The computing system 200 may be coupled via the bus 202 to a display 212, such as a cathode ray tube (CRT) or liquid crystal display (LCD), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non-volatile media, volatile media, and transmission media. Transmission media may include coaxial cables, copper wire and fiber optics, including wires of the bus 202, while transmission may take the form of acoustic, light, or electromagnetic waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The computing system 200 may also include a communication interface 218 coupled to the bus 202. The communication interface 218 typically provides a two way data communication coupling between the computing system 200 and the network 110. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, a mobile money transfer application 220, or more precisely, the computer-readable instructions therefor, may reside on the storage device 210. The mobile money transfer application 220 may then be executed to conduct person-to-person money transfers according to the disclosed embodiments. In particular, the mobile money transfer application 220 may allow the payer 106 to initiate a money transfer, the payee 108 to accept and confirm the money transfer, using their respective handheld mobile devices. The mobile money transfer application 220 after thereafter allow the payers financial institution 102 to transfer the money over a real-time financial network 110 to the payee's financial institution 112.

Figure 3:
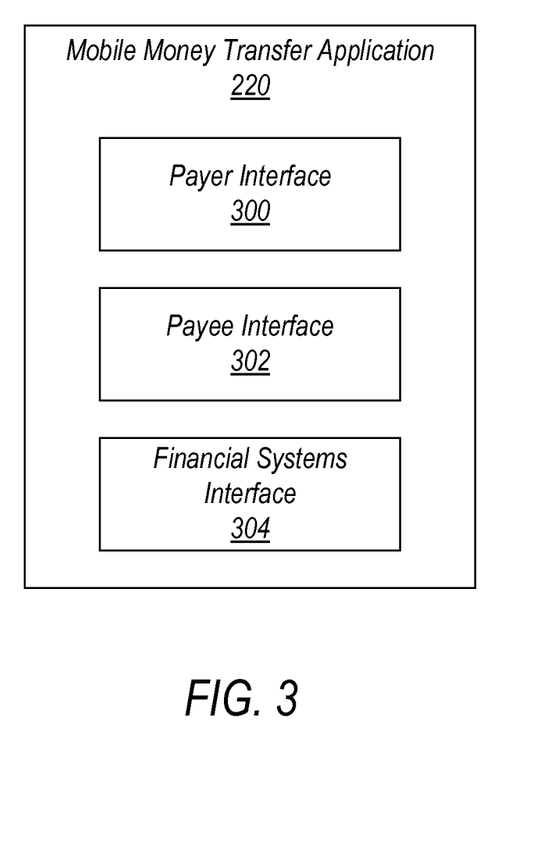
FIG. 3 illustrates an exemplary application that may be used for conducting person-to-person money transfers over handheld mobile devices according to disclosed embodiments.

Referring now to FIG. 3, in one embodiment, the mobile money transfer application 220 may comprise a number of functional components, including a payer interface module 300, a payee interface module 302, and a financial systems interface module 304. Other functional components may also be added to or removed from the mobile money transfer application 220 without departing from the scope of the disclosed embodiments. Note that although the various functional components 300-304 of the mobile money transfer application 220 have been shown as discrete units in FIG. 3, those having ordinary skill in the art will understand that two or more of these components may be combined into a single component, and that any individual component may be divided into several constituent components, without departing from the scope of the disclosed embodiments.

In general, the payer interface module 300 is responsible for allowing the payer 106 to initiate payment by inputting various items of information to the financial institution 102. To this end, the payer interface module 300 may provide a user interface for receiving the information from the payer 106. Such information may include, for example, the payee's name and mobile number, the payment amount, the payer's account number, and other similar information. The interface provided by the payer interface module 300 may be in the form of a graphical interface (e.g., a Web page), a voice interface (e.g., a Speech Application Language Tags (SALT) page), an IVR interface, and the like. The particular design and layout of the interfaces is not overly important to the practice of the disclosed embodiments. It is also possible for the payer interface module 300 to simply receive a text message containing the information from the payer 106.

In a similar manner, the payee interface module 302 is responsible for allowing the payee 108 to receive payment by inputting various items of information to the financial institution 102. Thus, the payee interface module 302 may provide a user interface for receiving the information from the payee 108. Such information may include, for example, a unique transaction ID, the payer's name, the payment amount, the payee's bank and account number, and other similar information. The interface provided by the payee interface module 302 may likewise be in the form of a graphical interface (e.g., a Web page), a voice interface (e.g., a SALT page), an IVR interface, and the like. And again, the particular design and layout of the interfaces is not overly important to the practice of the disclosed embodiments. The payee interface module 302 is responsible for notifying the payee 108 of a pending payment by sending a text message containing the payment information to the payee 108.

The financial systems interface module 304 is responsible for causing a payment to be sent from the payer's financial institution 102 to the payee's financial institution 112. To this end the financial systems interface module 304 may provide an interface between the mobile money transfer application 220 and the various backend systems (not expressly shown) of the financial institution 102. For example, in a bank, the financial systems interface module 304 may allow the mobile money transfer application 220 to communicate information about a pending payment with processes running on the backend systems that are responsible for transferring funds and the like. To this end, the financial systems interface module 304 may implement any communication protocols necessary to allow the mobile money transfer application 220 to communicate with the backend systems. Such protocols may include, for example, Hypertext Transfer Protocol (HTTP), File Transfer Protocol (FTP), Telnet, and any other suitable communication protocol known to those having ordinary skill in the art. In addition, the financial systems interface module 304 may function to implement any data format required for data to be exchanged between the mobile money transfer application 220 and the backend systems.

In operation, the payer 106 may initiate a person-to-person money transfer by sending an e-mail message or a text message from his/her handheld mobile device to his/her financial institution 102. Such an initiation e-mail message (or text message) may be received by the payer interface module 300 of the mobile money transfer application 220. The payer interface module 300 may then scan the initiation e-mail message (or text message) for certain predefined items of information, such as the payee's name and mobile number, the payment amount, the payer's account number, and the like. This information is then provided to the payee interface module 302 for notifying the payee 108 of a pending payment and ultimately to the financial systems interface module 304 for processing the payment.

Figure 4:
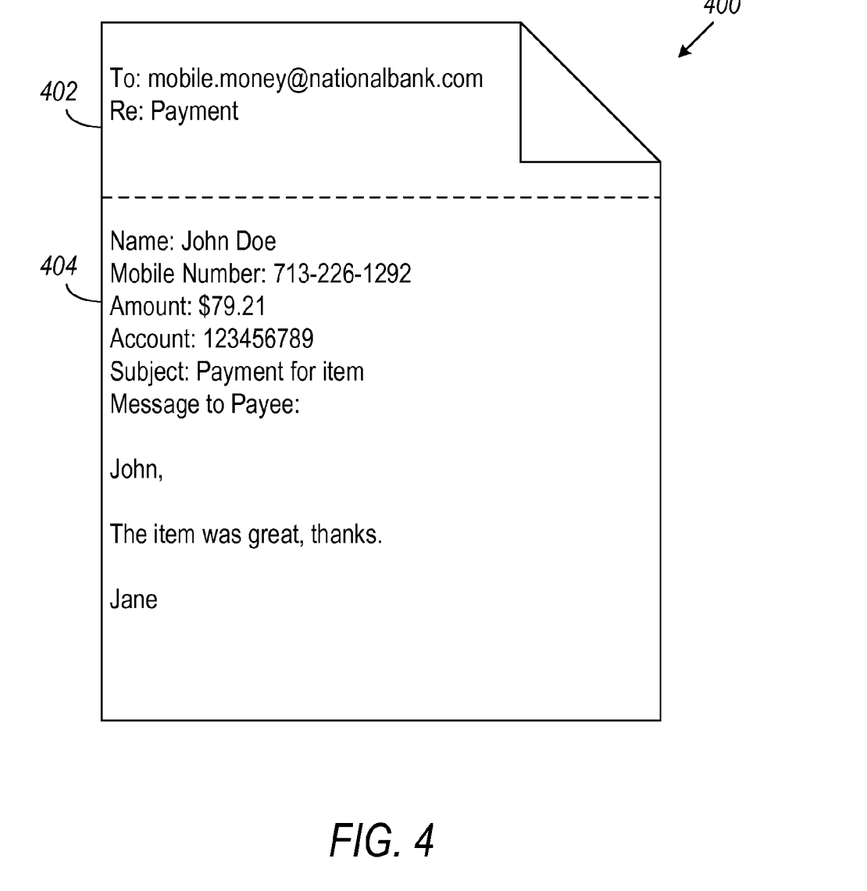
FIG. 4 illustrates an exemplary text message that may be used for making person-to-person money transfers over handheld mobile devices according to disclosed embodiments.

FIG. 4 illustrates an example of an initiation e-mail message (or text message) 400 having a header 402 and a body 404 that may be used to initiate the person-to-person money transfer. In some embodiments, the initiation e-mail message (or text message) 400 may be sent to a particular e-mail address (e.g., mobile.money@nationalbank.com) that has been set up specifically for receiving such person-to-person money transfer e-mail messages. In these embodiments, the payer 106 has learned or otherwise understands that the initiation e-mail message (or text message) 400 should contain specific items of information, such as the term "payment" or the like in the subject line of the header 402. The payer 106 has further learned or otherwise understands that the initiation e-mail message (or text message) 400 should contain certain items of information, such as the payee's name and mobile number, the payment amount, and the payer's account number in the body 404. In some embodiments, the initiation e-mail message (or text message) 400 may also contain an optional message to the payee 108, for example, in order to document the purpose of the payment.

In some embodiments, instead of the initiation e-mail message (or text message) 400, the payer 106 may provide the various items of payment information to the payer interface module 302 via a telephone call, for example, from his/her handheld mobile device to an IVR system (not expressly shown) in a manner known to those having ordinary skill in the art.

Figure 5:
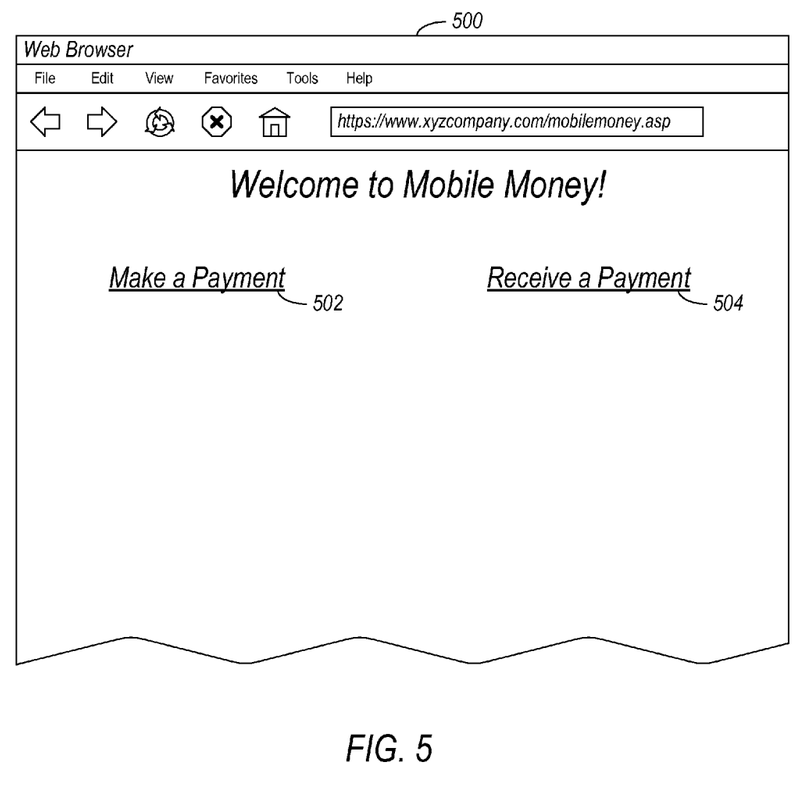
FIG. 5 illustrates an exemplary Web site that may be used for conducting person-to-person money transfers over handheld mobile devices according to disclosed embodiments.

In some embodiments, the payer interface module 300 may also receive the various items of payment information through a Web site of the payer's financial institution 102. FIG. 5 illustrates an example of a Web site 500, or the homepage therefor to be more accurate, that may be used to receive the items of payment information from the payer 106. As can be seen, the Web site 500 may include a hyperlink 502 for making payment that the payer 106 may click on to initiate a person-to-person money transfer. The Web site 500 may also include a hyperlink 504 for receiving a payment that the payee 108 may click on to accept and/or confirm the person-to-person money transfer.

Figure 6:
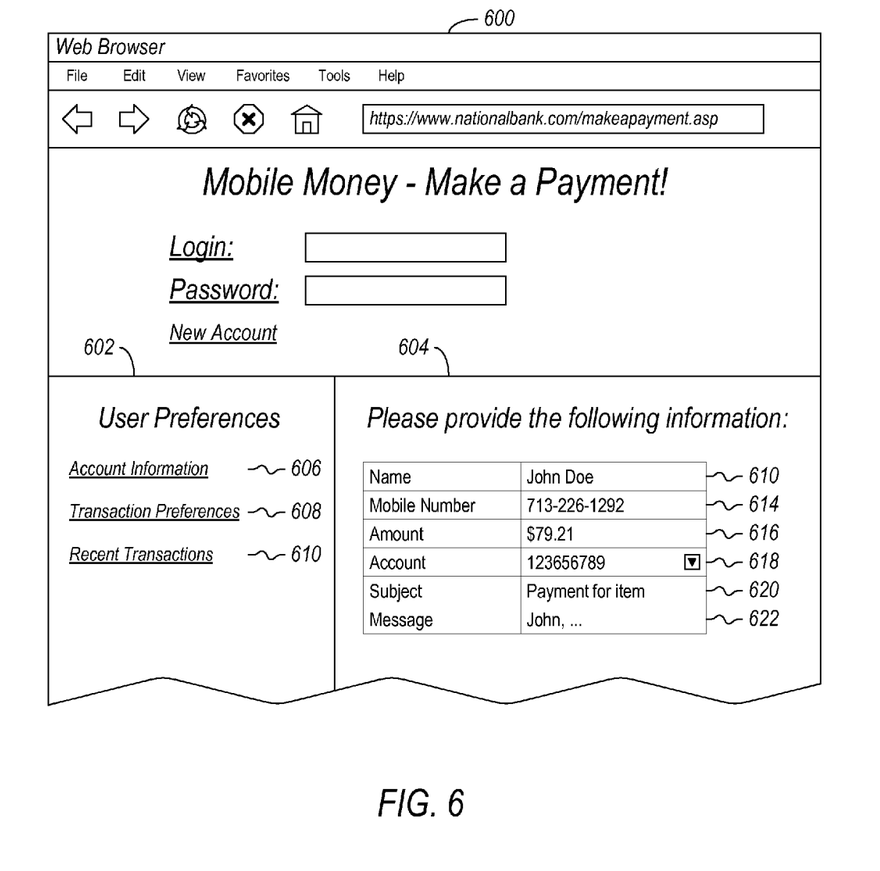
FIG. 6 illustrates an exemplary Web page that may be used for making person-to-person money transfers over handheld mobile devices according to disclosed embodiments.

Clicking on the make-a-payment hyperlink 502 may take the payer 106 to an exemplary Web page 600, as shown in FIG. 6, that may allow the payer 106 to input the various items of payment information to initiate a person-to-person money transfer. Such a Web page 600 may be provided by the payer interface module 300 and may include a user preferences area 602 for viewing and modifying user preferences and a payment information area 604 or entering information needed to initiate the money transfer. In some embodiments, the Web page 600 may require the payer 106 to log in and provide a password before he/she may be allowed to access any of the hyperlinks in the user preferences area 602 or the payment information area 604. If the payer 106 is new and does not have an existing mobile money transfer account, he/he may be given an opportunity to open an account at this time. Note that the payer 106 must be a member or otherwise have an account with his/her financial institution 102 in order to open a mobile money transfer account.

As can be seen, the user preferences area 602 may provide hyperlinks for allowing the payer 106 to view and modify one or more user preferences, including account information 606 and transaction preferences 608. Examples of account information may include account name, address, phone number, login ID, password, and the like. Examples of transaction preferences may include which accounts (e.g., checking, savings, etc.) are allowed to be used for making person-to-person money transfers, maximum transfer amount per transaction, minimum balance that must be maintained, and the like. In addition, a recent transactions 610 hyperlink may also be provided for allowing the payer 106 to access and view recently concluded person-to-person money transfers.

The payment information area 604 may include a plurality of fields for the payer 106 to input information concerning the person-to-person money transfer. For example, there may be a name field 612 for inputting the payee's name, a mobile number field 614 for inputting the payee's mobile number, an amount field 616 for inputting the payment amount, and an account field 618 for inputting the payer's account number. In some embodiments, the payment information area 604 may also provide an optional subject field 620 for inputting text to be used in the subject line of a notification text message that may be sent to the payee 108. Similarly, the payment information area 604 may further provide an optional message field 622 for inputting text to be used in the body of the notification text message that may be sent to the payee 108.

Figure 7:
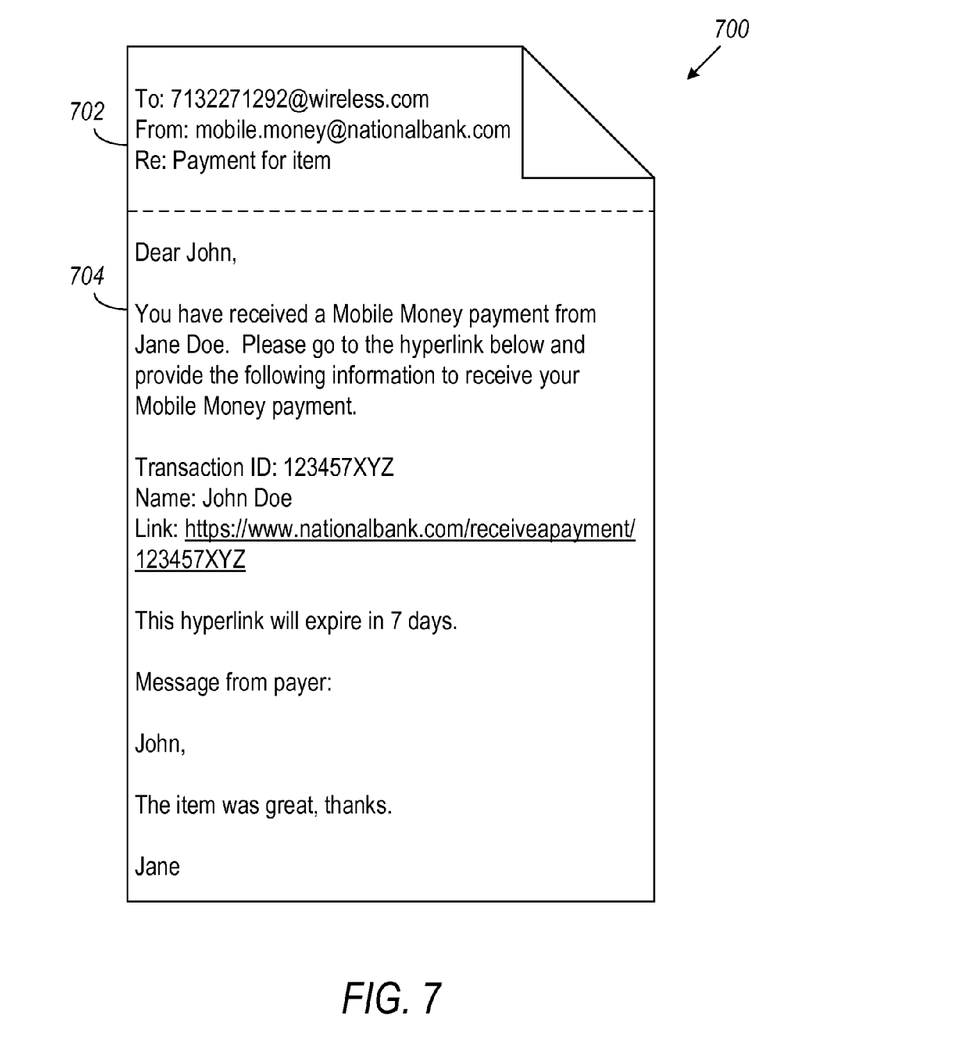
FIG. 7 illustrates an exemplary text message that may be used for receiving person-to-person money transfers over handheld mobile devices according to disclosed embodiments.

FIG. 7 illustrates an example of a notification text message 700 that may be sent to the payee 108 by the payee interface module 302 after receipt of the payment information from the payer 106. As can be seen, the notification text message may comprise a header 702 and a body 704. The header 702 may include, among other things, the subject that the payer 106 inputted into the subject field 620 (see FIG. 6), whereas the body 704 may include, among other things, a set of instructions telling the payee 108 how to receive the person-to-person money transfer along with information that may be needed to receive the person-to-person money transfer. Such information may include, for example, a unique transaction ID for the money transfer, the name of the payer 106, and a hyperlink to the Web site 500 of the payer's financial institution 102. Such a hyperlink may be a hot link that takes the payee 108 directly to a receive-a-payment Web page and automatically enters the unique transaction ID into the Web page. In that case, the hyperlink may have a predefined expiration (e.g., seven days). Alternatively, the hyperlink may simply be a link to the homepage of the payer's financial institution's Web site 500.

In some embodiments, instead of the notification text message 600, the payee interface module 302 may notify the payee 108 of the pending payment via an automated telephone message placed to the payee's mobile telephone number in a manner known to those having ordinary skill in the art.

Figure 8:
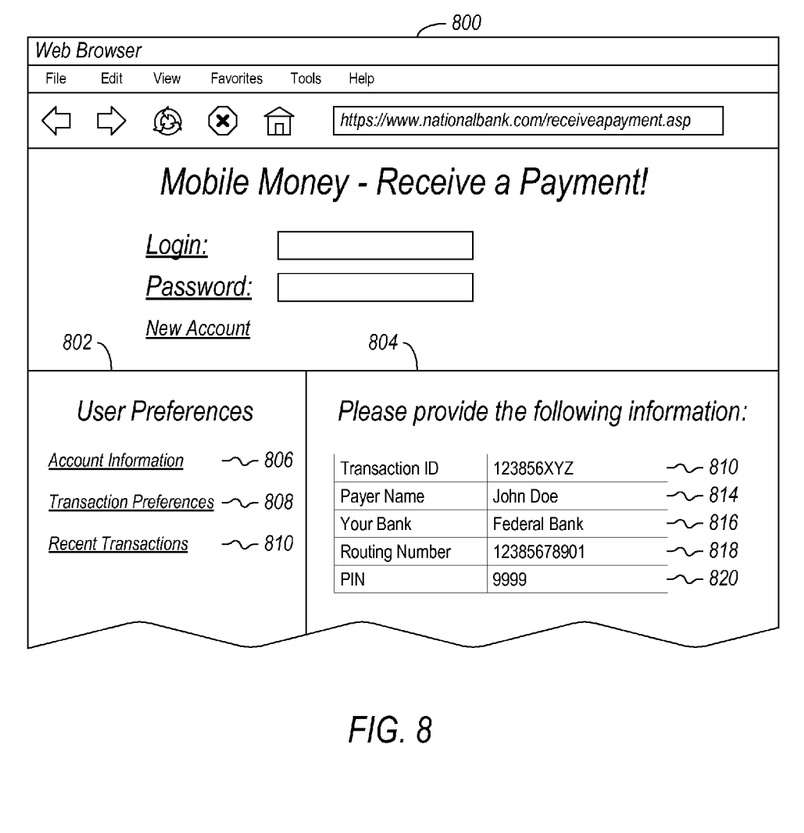
FIG. 8 illustrates an exemplary Web page that may be used for receiving person-to-person money transfers over handheld mobile devices according to disclosed embodiments.

In any event, clicking on the hyperlink in the notification message 700 may take the payee 108 to an exemplary Web page 800, as shown in FIG. 8, that may allow the payee 108 to enter the various items of information needed to accept and confirm the person-to-person money transfer. Such a Web page 800 may be provided by the payee interface module 302 and may include a user preferences area 802 for viewing and modifying user preferences and a payment information area 804 or entering information needed to complete the money transfer. In some embodiments, the Web page 800 may require the payee 108 to log in and provide a password before he/she may be allowed to access any of the hyperlinks in the user preferences area 802 or the payment information area 804. If the payee 108 is new and does not have an existing mobile money transfer account, he/he may be given an opportunity to open an account at this time. Note that the payee 108 does not need to be a member or otherwise have an account with the financial institution 102 in order to open a mobile money transfer account.

Like the previously-discussed user preferences area 602 (see FIG. 6), the user preferences area 802 may provide hyperlinks for allowing the payee 108 to view and modify one or more user preferences, including account information 806 and transaction preferences 808. As before, examples of account information may include account name, address, phone number, login ID, password, and the like. Examples of transaction preferences may include which accounts (e.g., checking, savings, etc.) are allowed to receive person-to-person money transfers and the like, and may only be available to payees 108 who are also members or account holders of the same financial institution as the payer 106 (i.e., an intra-bank transaction). In addition, a recent transactions 810 hyperlink may also be provided for allowing the payee 108 to access and view recently concluded person-to-person money transfers.

Also like the previously-discussed payment permissions area 604 (see FIG. 6), the payment information area 804 may include a plurality of fields for the payee 108 to input information concerning the person-to-person money transfer. For example, there may be a transaction ID field 812 for inputting the unique transaction ID, a payer name field 814 for inputting the payer's name, a bank field 816 for inputting the name of the payee's financial institution, a routing number field 818 for inputting the routing number of the payee's financial institution, and an account number field 820 for inputting the payee's account number.

In some embodiments, once the above payment information has been entered by the payee 108, the payee interface module 302 may verify the payment information before, for example, by comparing the information to the information received from the papers of 106. If the payment information is verified, the payee interface module 302 may simply pass the information to the financial systems interface module 304 for processing without any further confirmation from the payer 106. The financial systems interface module 304 then proceeds to communicate the payment information to the backend systems of the payer's financial institution 102, which carries out the money transfer in accordance with procedures and protocols known to those having ordinary skill in the financial industry.

In some embodiments, however, the payee interface module 302 may alert the payer interface module 300 that the payee 108 has accepted the money transfer prior to passing the payment information to the financial systems interface module 304. The payer interface module 300 may then notify the payer 106 via a text message or a telephone call to his/her handheld mobile device that the payee 108 has accepted the money transfer and provide the details of the money transfer (e.g., payee name, amount, etc.). The payer 106 may thereafter acknowledge the acceptance or otherwise confirm the money transfer in order for the payment to proceed. This arrangement allows the payer 106 to verify that he/she has sent the payment to the correct person (i.e., in case he/she typed in the wrong mobile phone number) before the money transfer is actually carried out. Other techniques for minimizing the risk of the above contingency may also be used without departing from the scope of the disclosed embodiments.

In some embodiments, the funds that will be used to complete the money transfer are moved out of the payer's account only at the time the money transfer is to be conducted. In other embodiments, the funds are moved out of the payer's account and into a temporary holding account (e.g., a so-called "lock box") as soon as he/she initiates the money transfer. The funds may then be used to earn interest for the financial institution until the time the money transfer is to be conducted, which may be several days depending on when the payee 108 actually accesses the receive-a-payment Web site 800 (see FIG. 8).

Figure 9:
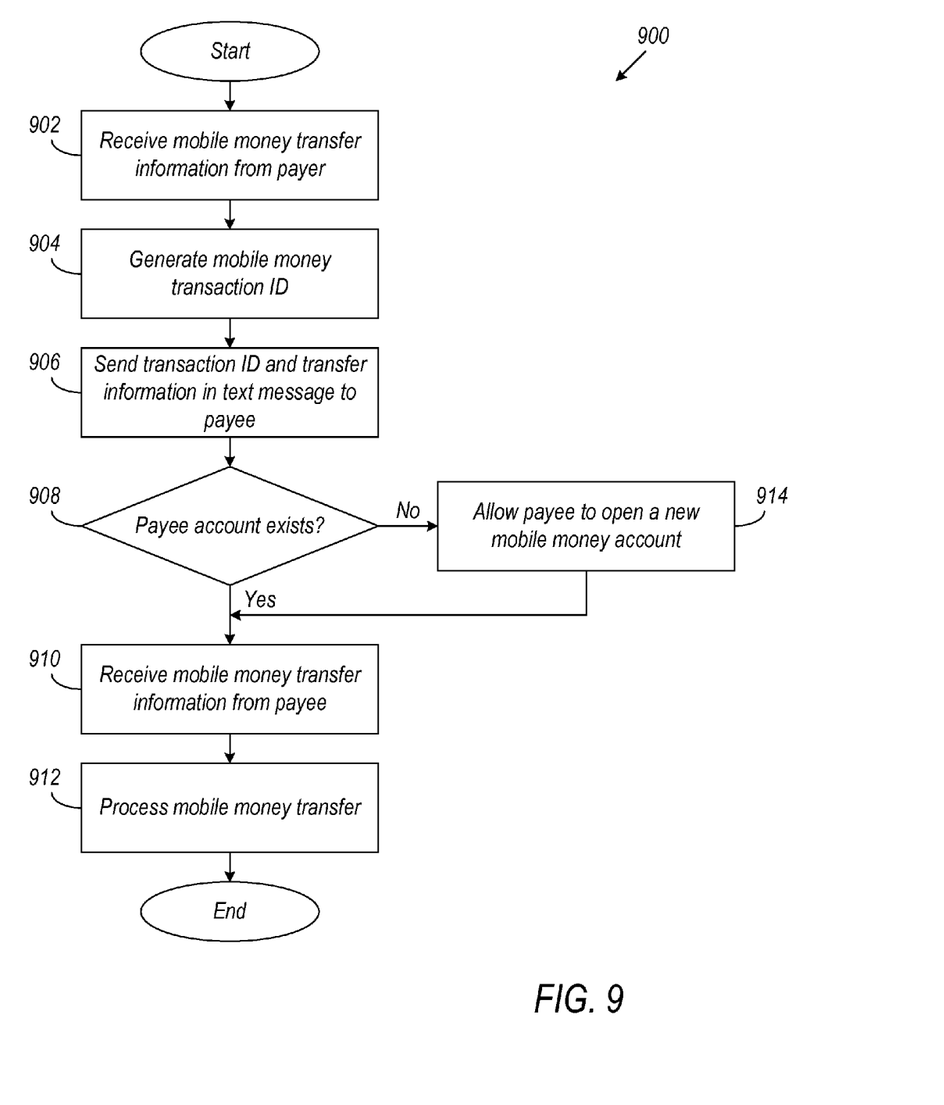
FIG. 9 illustrates an exemplary method that may be used for conducting person-to-person money transfers over handheld mobile devices according to disclosed embodiments.

Thus far, specific embodiments have been disclosed for conducting person-to-person money transfers using handheld mobile devices according to the disclosed embodiments. Referring now to FIG. 9, general guidelines are shown in the form of a method that may be used by a financial institution (or the computing system therefor to be more accurate) to implement the various embodiments disclosed above. As can be seen in FIG. 9, an exemplary method 900 for conducting person-to-person money transfers using handheld mobile devices begins at block 902, where information concerning a person-to-person money transfer may be received at the financial institution from a payer, for example, via text message, telephone call, or the like. A unique transaction ID may be generated for the money transfer at block 904, and the unique transaction ID and money transfer information may be provided to a payee at block 906, again, via text message, telephone call, or the like. When the payee subsequently tries to accept the money transfer, for example, via the financial institution's Web site, a determination may be made at block 908 as to whether he/she has an existing mobile money transfer account with the financial institution. If yes, then information concerning the money transfer may be received by the financial institution from the payee at block 910. The money transfer may then be completed by the financial institution at block 912 using a real time financial network or ACH in the alternative. In some embodiments, the payer may confirm the money transfer before it is completed by the financial institution. If the payee does not have an existing mobile money transfer account with the financial institution (see block 908), then at block 914, he/she may be allowed to open such an account with the financial institution. The method 900 thereafter continues to block 910 where it proceeds in the manner described above.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for conducting a money transfer between a payer using a first handheld mobile device and a payee using a second handheld mobile device, the system comprising:
   a computer, operated at the direction of a financial institution, the computer having a processor programmed to:
      receive a money transfer message initiated by the payer from the first handheld mobile device, wherein the payer is a customer of the financial institution and is a registered user of the system, wherein the money transfer message identifies the payee and includes contact information for the payee;
      scan the money transfer message for a set of money transfer information including a name of the payee, a number of the second handheld mobile device, a transfer amount, and an account number of the payer;
      generate a unique transaction ID based on the money transfer message;
      provide first transaction information concerning the money transfer to the second handheld mobile device, the first transaction information including the unique transaction ID, a name of the payer, the transfer amount, and a hyperlink to a webpage of the financial institution, the hyperlink having an expiration;
      receive at the financial institution from the second handheld mobile device, second transaction information concerning the money transfer, the second transaction information including the unique transaction ID and a name of the payer, wherein at least a portion of the second transaction information including the unique transaction ID is automatically entered into the webpage using the hyperlink;
      verify at the financial institution the second transaction information by comparing the second transaction information to the first transaction information; and
      conduct the money transfer at the financial institution after verifying the second transaction information.

2. The system of claim 1, wherein the first transaction information is provided using an electronic message sent to the second handheld mobile device.

3. The system of claim 2, wherein the electronic message is sent to the second handheld mobile device using one of: a short messaging service protocol and an electronic messaging protocol.

4. The system of claim 1, wherein the processor is further programmed to:
   transmit a confirmation message to the first handheld mobile device in response to receiving the second transaction information; and
   receive, from the first handheld mobile device, an acknowledgement of the confirmation message before conducting the money transfer.

5. The system of claim 1, wherein the payee is a member or account holder of the financial institution.

6. The system of claim 1, wherein at least a portion of the money transfer message initiated by the payer is indicated in one or more money transfer user preferences associated with the payer, wherein the user preferences include account information and transaction preferences.

7. A method of conducting a money transfer between a payer using a first handheld mobile device and a payee using a second handheld mobile device, the method comprising:
   receiving, at a computer operated at the direction of a financial institution, a money transfer message initiated by the payer from the first handheld mobile device, wherein the payer is a customer of the financial institution and is a registered user of a money transfer system operated by the financial institution, wherein the money transfer message identifies the payee and includes contact information for the payee;
   scanning the money transfer message for a set of money transfer information including a name of the payee, a number of the second handheld mobile device, a transfer amount, and an account number of the payer;
   generating a unique transaction ID based on the money transfer message;
   providing, using the computer, first transaction information concerning the money transfer to the second handheld mobile device, the first transaction information including the unique transaction ID, a name of the payer, the transfer amount, and a hyperlink to a webpage of the financial institution, the hyperlink having an expiration;
   receiving, at the computer from the second handheld mobile device, second transaction information concerning the money transfer, the second transaction information including a payee transaction ID and a name of the payer, wherein at least a portion of the second transaction information including the payee transaction ID is automatically entered into the webpage using the hyperlink;
   verifying, using the computer, the second transaction information by comparing the second transaction information to the first transaction information; and
   conducting the money transfer at the financial institution after verifying the second transaction information.

8. The method of claim 7, wherein the first transaction information is provided using an electronic message sent to the second handheld mobile device.

9. The method of claim 7, wherein comparing the second transaction information to the first transaction information includes comparing the payee transaction ID to the unique transaction ID.

10. The method of claim 7, wherein the first transaction information is provided using a telephone call to the second handheld mobile device.

11. The method of claim 7, further comprising:
   transmitting a confirmation message to the first handheld mobile device in response to receiving the second transaction information; and
   receiving, from the first handheld mobile device, an acknowledgement of the confirmation message before conducting the money transfer.

12. The method of claim 7, wherein the payee is a member or account holder of the financial institution.

13. The method of claim 7, wherein the payee is not a member or account holder of the financial institution.

14. The method of claim 7, further comprising moving funds for completing the money transfer from an account of the payer to a temporary holding account until verifying that the second transaction information matches the first transaction information.

15. A computer-readable medium encoded with computer-readable instructions for conducting a money transfer between a payer using a first handheld device and a payee using a second handheld device, the computer-readable instructions comprising instructions for causing a computer to:
   receive a money transfer message initiated by the payer from the first handheld device, wherein the payer is a customer of a financial institution that operates the computer and is a registered user of a money transfer system operated by the financial institution, wherein the money transfer message identifies the payee and includes contact information for the payee;

scan the money transfer message for a set of money transfer information including a name of the payee, a number of the second handheld device, a transfer amount, and an account number of the payer;

generate a unique transaction ID based on the money transfer message;

provide instructions regarding how to receive the money transfer and first transaction information concerning the money transfer to the second handheld device, the first transaction information including the unique transaction ID, a name of the payer, the transfer amount, and a hyperlink to a webpage of the financial institution, the hyperlink having an expiration;

receive, at the financial institution from the second handheld device, second transaction information concerning the money transfer, the second transaction information including a payee account, a payee transaction ID and a name of the payer, at least a portion of the second transaction information automatically entered into the webpage using the hyperlink, wherein at least a portion of the second transaction information including the payee transaction ID is automatically entered into the webpage using the hyperlink;

verify, at the financial institution, that at least a portion of the second transaction information matches the first transaction information; and conduct the money transfer at the financial institution after verifying that the second transaction information matches the first transaction information.

16. The computer-readable medium of claim 15, wherein the first transaction information is provided using an electronic message sent to the second handheld device.

17. The computer-readable medium of claim 16, wherein verifying that the second transaction information matches the first transaction information includes comparing the payee transaction ID to the unique transaction ID.

18. The computer-readable medium of claim 15, wherein the payee account is indicated in user preferences of the payee.

19. The computer-readable medium of claim 15, wherein the instructions further cause the computer to:

transmit a confirmation message to the first handheld device in response to receiving the second transaction information; and receive, from the first handheld device, an acknowledgement of the confirmation message before conducting the money transfer.

20. The computer-readable medium of claim 15, wherein the payee is a member or account holder of the financial institution.

21. The computer-readable medium of claim 15, wherein the payee is not a member or account holder of the financial institution.

* * * * *